(12) United States Patent
Schmid et al.

(10) Patent No.: US 12,525,124 B2
(45) Date of Patent: Jan. 13, 2026

(54) SYSTEM FOR MONITORING A TRAFFIC SITUATION

(71) Applicant: Robert Bosch GmbH, Stuttgart (DE)

(72) Inventors: Rolf Schmid, Uerikon (CH); Florian Poprawa, Freiburg (DE); Ludger Fiege, Grafing (DE)

(73) Assignee: Robert Bosch GmbH, Stuttgart (DE)

( * ) Notice: Subject to any disclaimer, the term of this patent is extended or adjusted under 35 U.S.C. 154(b) by 588 days.

(21) Appl. No.: 17/913,942

(22) PCT Filed: Mar. 2, 2021

(86) PCT No.: PCT/EP2021/055136
§ 371 (c)(1),
(2) Date: Sep. 23, 2022

(87) PCT Pub. No.: WO2021/190872
PCT Pub. Date: Sep. 30, 2021

(65) Prior Publication Data
US 2023/0132260 A1    Apr. 27, 2023

(30) Foreign Application Priority Data
Mar. 23, 2020   (DE) ................. 10 2020 203 715.9

(51) Int. Cl.
*G08G 1/04* (2006.01)
*G08G 1/01* (2006.01)

(52) U.S. Cl.
CPC ............. *G08G 1/04* (2013.01); *G08G 1/0125* (2013.01)

(58) Field of Classification Search
CPC ................................. G08G 1/04; G08G 1/0125
See application file for complete search history.

(56) References Cited

U.S. PATENT DOCUMENTS

| | | | |
|---|---|---|---|
| 5,510,794 A * | 4/1996 | Asbury | G01S 13/70 |
| | | | 342/44 |
| 6,278,399 B1 | 8/2001 | Ashihara | |
| 10,235,882 B1 * | 3/2019 | Aoude | G06N 5/046 |
| 10,649,117 B1 * | 5/2020 | Lewellen | G02B 5/122 |

(Continued)

FOREIGN PATENT DOCUMENTS

| | | |
|---|---|---|
| DE | 19946161 A1 | 4/2001 |
| DE | 60016064 T2 | 11/2005 |

(Continued)

*Primary Examiner* — Marcus E Windrich
(74) *Attorney, Agent, or Firm* — Norton Rose Fulbright US LLP

(57) ABSTRACT

A system for monitoring a traffic situation includes at least one radar sensor unit for recording environmental data in a monitoring region of the radar sensor unit. A central processor evaluates the environmental data from the radar sensor unit and determines the traffic situation within the monitoring region based on the environmental data. A reference signal unit for outputting a reference signal to the radar sensor unit is configured to modulate a radar signal emitted by the radar sensor unit and to reflect a modulated radar signal back to the radar sensor unit as a reference signal. The processor identifies the modulated radar signal as a reference signal from the reference signal unit and recognizes a malfunction of the radar sensor unit if a reference signal is not received by the radar sensor unit.

11 Claims, 5 Drawing Sheets

(56) References Cited

U.S. PATENT DOCUMENTS

| | | | | |
|---|---|---|---|---|
| 2008/0018525 | A1* | 1/2008 | Svy | G01S 7/024 |
| | | | | 342/172 |
| 2013/0151135 | A1* | 6/2013 | Aubrey | G08G 1/0116 |
| | | | | 701/117 |
| 2013/0300583 | A1* | 11/2013 | Wignot | G01S 13/91 |
| | | | | 340/907 |
| 2014/0159925 | A1* | 6/2014 | Mimeault | G01S 7/484 |
| | | | | 340/935 |
| 2014/0232566 | A1* | 8/2014 | Mimeault | G01S 17/88 |
| | | | | 340/936 |
| 2015/0029051 | A1* | 1/2015 | Driscoll | H01Q 3/30 |
| | | | | 342/51 |
| 2017/0276658 | A1* | 9/2017 | Zilio | G08G 1/015 |
| 2019/0135317 | A1* | 5/2019 | Hilleary | G01S 13/62 |
| 2020/0118430 | A1* | 4/2020 | Kaster | G01S 13/91 |
| 2020/0410263 | A1* | 12/2020 | Gao | G01S 17/931 |

FOREIGN PATENT DOCUMENTS

| | | |
|---|---|---|
| DE | 102007043460 B4 | 8/2012 |
| DE | 102016221440 A1 | 5/2018 |
| WO | WO 9520172 A1 | 7/1995 |
| WO | WO 2007075539 A1 | 7/2007 |
| WO | WO 2017065678 A1 | 4/2017 |

\* cited by examiner

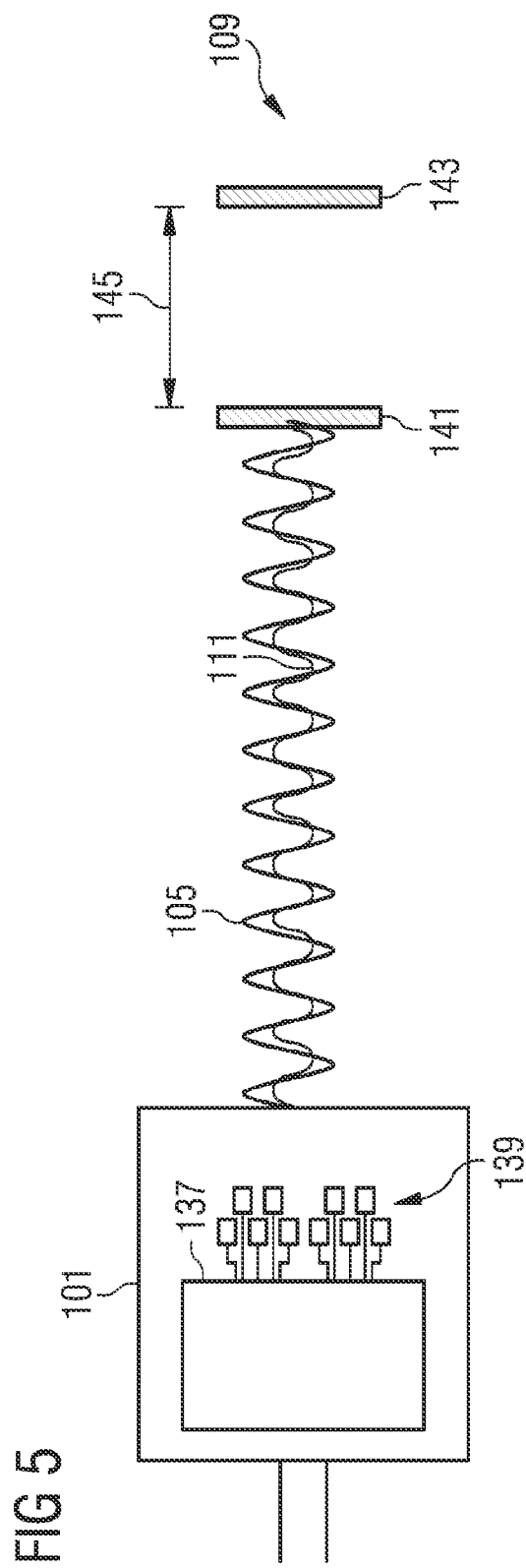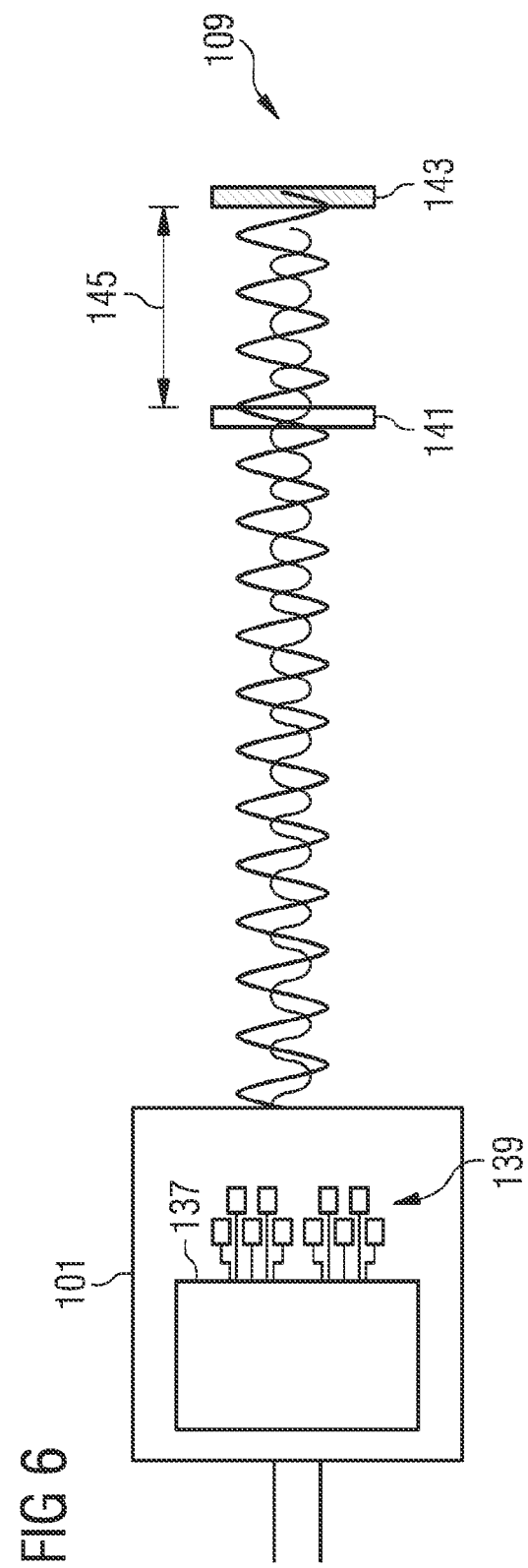

SYSTEM FOR MONITORING A TRAFFIC SITUATION

FIELD AND BACKGROUND OF THE INVENTION

The invention relates to a system for monitoring a traffic situation.

Radar development has increased strongly and continuously in the transportation sector. For self-driving cars and self-driving trains, radar systems are necessary so that obstacles can be reliably recognized. Due to the allocation of the frequency spectrum by ETSI up to over 70 GHz, radar sensors can now also be constructed to be physically very small.

Car manufacturers and industry mainly use the radar sensors for object recognition at from 0 to 300 m distance and for speed measurement. The sensors available on the market therefore act as pure sensors, i.e., they detect their surroundings on the basis of emitted radar waves. The reflected signal at the radar receiver changes constantly and is dependent upon the measuring object surface and the measuring location.

On the basis of the radar signals reflected within a monitoring range of a sensor unit and received by the respective sensor unit, the respective traffic situation within the monitoring region of the sensor unit, which is needed for controlling a self-driving vehicle, can be determined. In particular if sensor units are used for controlling self-driving vehicles, knowledge of the viability of the sensor units used is indispensable.

For reliable monitoring of a traffic situation, it is essential to be able to determine constantly the functional capability of the sensor unit being used in order to be able to identify any faulty sensor units.

SUMMARY OF THE INVENTION

It is an object of the present invention to provide a system for monitoring a traffic situation which enables a reliable identification of faulty sensor units.

This object is achieved with the system of the independent claim. Further developments are disclosed in the dependent claims.

According to one aspect of the invention, a system is provided for monitoring a traffic situation, comprising: at least one radar sensor unit for recording environmental data for a monitoring region of the radar sensor unit, wherein the radar sensor unit is designed to emit radar signals in the direction of the monitoring region, to receive radar signals reflected by objects within the monitoring region to the radar sensor unit and, on the basis of the received radar signal, to generate environmental data for the monitoring region;

a processor unit for evaluating the environmental data from the radar sensor unit and for determining the traffic situation within the monitoring region on the basis of the environmental data from the radar sensor unit; and a reference signal unit for emitting a reference signal to the radar sensor unit, characterized in that the reference signal unit is designed to provide a radar signal emitted by the radar sensor unit with a modulation and to reflect a modulated radar signal back to the radar sensor unit as the reference signal, and in that the processor unit is designed to identify the modulated radar signal as the reference signal from the reference signal unit and to recognize a malfunction of the radar sensor unit if no reference signal is received by the radar sensor unit.

By this means, the technical advantage is achieved that a system for monitoring a traffic situation can be provided which is suitable for checking a functioning of a radar sensor unit during operation. By means of the reference signal unit, a reference signal can be transmitted to the radar sensor unit, said signal can be detected by the radar sensor unit and interpreted by the processor unit. In the event that a reference signal of this type is not detected by the radar sensor unit, the processor unit can identify a malfunction of the respective radar sensor unit and possibly interpret the monitoring of the traffic situation as malfunctioning and end it.

The reference signal unit is designed to reflect the radar signals emitted by the radar sensor unit for monitoring the monitoring region of the radar sensor unit and to send them back to the radar sensor unit. During the process of reflection of the radar signals by the reference signal unit, an individual modulation is impressed upon the reflected radar signals by the reference signal unit, by way of which modulation the reflected radar signals can be identified by the processor unit as a reference signal of the reference signal unit. By this means, furthermore, the technical advantage is achieved that no separate transmitting unit is needed for the reference signal unit to emit the reference signal. The reference signals of the reference signal unit are based exclusively on the radar signals emitted by the radar sensor unit.

Radar signals are signals of electromagnetic radiation within the meaning of the application, in the frequency range between 60 GHz and 120 GHz that is usual for radar use.

A traffic situation within the meaning of the application is a situation in road or rail traffic. A traffic situation can comprise a traffic volume of vehicles, in particular, cars, goods vehicles, motorcycles, bicycles or of pedestrians or rail vehicles. A traffic situation can also comprise an absence of any traffic participants.

According to one embodiment, the reference signal unit has a first reflection state and a second reflection state and wherein a radar signal reflected by the reference signal unit in the first reflection state deviates in at least one property from a radar signal reflected by the reference signal unit in the second reflection state, and wherein the reference signal unit is alternatingly switchable at a switching frequency between the first reflection state and the second reflection state.

In this way, the technical advantage is achieved that during the reflection of the radar signals from the radar sensor unit by the reference signal unit, a modulation can be applied to the reflected radar signals so that reflected radar signals with an applied modulation reflected from the reference signal unit can be generated as reference signals. By way of the alternating switching of the reference signal unit between the first and the second reflection states, a reference signal can be generated which comprises alternating signal portions which deviate from one another in at least one property. This property can be, for example, an amplitude of the reflected radar signals so that by way of the alternating switching between the two reflection states, an amplitude-modulated or phase-modulated reflected radar signal can be generated as a reference signal.

According to one embodiment, the reference signal unit has a first reflection area which is designed to reflect radar signals of the radar sensor unit, wherein in the first reflection state, the reflection area is brought into a reflection position in which a reflection of the radar signals of the radar sensor unit is enabled and wherein in the second reflection state, the reflection area is brought into a non-reflecting position in which a reflection of the radar signals from the radar sensor unit is prevented.

In this way, the technical advantage is achieved that a simple solution for generating the reference signal as a modulated reflected radar signal can be provided. In that alternatingly, the first reflection area is switched between a reflection position in which a reflection of the radar signals of the radar sensor unit is enabled and a non-reflection position in which no reflection of the radar signals takes place, an amplitude-modulated reflected radar signal can be generated as a reference signal. In this way, the simplest possible realization of the modulated reference signal is achieved.

Alternatively, the reflection areas can be realized with equivalent antenna elements, wherein for switching the reflection areas between the non-reflecting position and the reflecting position, the antenna elements are electronically controllably switchable alternatingly into a non-reflecting state and/or into a reflecting state.

According to one embodiment, the reference signal unit further has a second reflection area wherein the second reflection area is designed to reflect radar signals of the radar sensor unit, and wherein in the second reflection state, the second reflection area is brought into a reflection position in which a reflection of the radar signals of the radar sensor unit is enabled by the second reflector unit.

In this way, the technical advantage is achieved that a further simple solution for generating the modulated reference signal can be provided. In that the first and second reflection areas can be alternatingly brought into the reflection position, a modulated reflected radar signal can be generated.

According to one embodiment, the first reflection area and the second reflection area are arranged at different distances from the radar sensor unit.

In this way, the technical advantage is achieved that a further simple solution for generating the modulated reference signal can be provided. By way of the separation of the two reflection areas from one another in the direction toward the radar sensor unit, it is achieved that the radar signals reflected by the first reflection area or the radar signals reflected by the second reflection area cover different distances from their emission by the radar sensor unit until their reception by the radar sensor unit. By way of the alternating switching of the first and second reflection areas into corresponding reflection positions, a modulated reflected radar signal can thus be generated with alternatingly arranged signal portions of different distances covered.

According to one embodiment, the reference signal unit comprises a first antenna array and/or a second antenna array, wherein the antenna array and/or the second antenna array is configured to reflect radar signals of the radar sensor unit and wherein the first reflection area and/or the second reflection area is formed by the first antenna array and/or the second antenna array.

In this way, the technical advantage is achieved that a further simple solution for generating the modulated reference signal can be provided. In that the first reflection area and/or the second reflection area is formed by a first antenna array and/or a second antenna array, the reference signal unit can be switched electrically between the first reflection state and the second reflection state. In that the first antenna array and/or the second antenna array can be switched on or off alternatingly, wherein in the switched-on state, the respective antenna array can reflect a received radar signal back to the radar sensor unit, whereas in the switched-off state, a reflection of the radar signal is not possible, a modulated reflected radar signal can be generated. By way of the electrical switching or the electrical switching on and off of the two antenna arrays, any desired switching frequency of the reference signal unit and connected thereto, any desired modulation frequency of the reference signal can be achieved.

According to one embodiment, the reference signal unit comprises a reflection body with at least one body area, wherein a reflection layer is applied to the at least one body area, wherein the reflection layer is configured to reflect radar signals and wherein the first reflection area and/or the second reflection area is formed by the reflection layer applied to the at least one body area.

In this way, the technical advantage is achieved that a further simple solution for generating the modulated reference signal can be provided. For this purpose, the reference signal unit comprises a reflector body with at least one body area onto which a reflection layer which is configured to reflect radar signals is applied. In that alternatingly, the reflection layer is brought into the reflection position in which a reflection of the radar signals of the radar sensor unit is enabled, whereas in a non-reflection position of the reflection layer, no reflection of the radar signals is enabled, an amplitude-modulated reflected radar signal can again be generated.

According to one embodiment, the radar sensor unit is positionally fixed at a road section or a rail section that is to be monitored, and wherein the reference signal unit is positionally fixed in the monitoring region of the radar sensor unit.

In this way, the technical advantage is achieved that a positionally fixed traffic situation can be monitored. In that the radar sensor unit is positionally fixed at a road section or a rail section that is to be monitored, traffic situations of this selected road section or rail section can be monitored. In that the reference signal unit is positionally fixed in the monitoring region of the radar sensor unit, it can be ensured that by way of the absence of a detection of a reference signal of the reference signal unit by the radar sensor unit, a malfunction of the radar sensor unit can be determined. In this way, a reliably positionally fixed system for monitoring a traffic situation can be provided.

According to one embodiment, the system also comprises a further radar sensor unit for recording environmental data for a further monitoring region of the further radar sensor unit, wherein the further radar sensor unit is configured to emit further radar signals in the direction of the further monitoring region, to receive radar signals reflected by objects within the further monitoring region to the further radar sensor unit and, on the basis of the received further radar signals, to generate further environmental data for the further monitoring region;

a further processor unit for evaluating the further environmental data from the further radar sensor unit and for determining the traffic situation within the further monitoring region on the basis of the further environmental data from the further radar sensor unit, wherein the reference signal unit is configured to provide further radar signals emitted by the further radar sensor unit with the modulation and to reflect back to the further radar sensor unit a further modulated radar signal as a further reference signal, wherein the further processor unit is configured to identify the further modulated radar signal as a further reference signal of the reference signal unit and to recognize a malfunction of the further radar sensor unit if no further reference signal is received by the further radar sensor unit and wherein the further radar sensor unit is arranged on a self-driving vehicle.

In this way, the technical advantage is achieved that a system for monitoring a traffic situation can be provided in which a plurality of radar sensor units can be checked for their viability by means of the reference signal unit. By way of the further radar sensor unit which can be installed, for example, in a self-driving vehicle, further reference signals can be generated as reflected radar signals of the further radar sensor unit. Via the further processor unit which is configured to evaluate the environmental data from the further radar sensor unit and to ascertain a corresponding traffic situation, on the basis of the detected further reference signals, a viability of the further radar sensor unit can be determined. In this way, the field of use of the system for monitoring a traffic situation can be widened.

According to one embodiment, the switching frequency is between 60 GHz and 85 GHz.

In this way, the technical advantage is achieved that a modulation of the reference signals and the further reference signals is achieved at a frequency which is in the range of a commercially available radar sensor unit and thus can be detected thereby.

The above-described properties, features and advantages of this invention as well as the manner and means by which they are achieved are more clearly and distinctly described in the context of the following description of the greatly simplified representations of preferred exemplary embodiments. In the drawings, shown schematically:

BRIEF DESCRIPTION OF THE FIGURES

FIG. 5 is a schematic representation of a reference signal unit of the system for monitoring a traffic situation according to one embodiment;

FIG. 6 is a schematic representation of the reference signal unit of the system for monitoring a traffic situation of FIG. 5 in a further state;

DETAILED DESCRIPTION OF THE INVENTION

Figure 1:
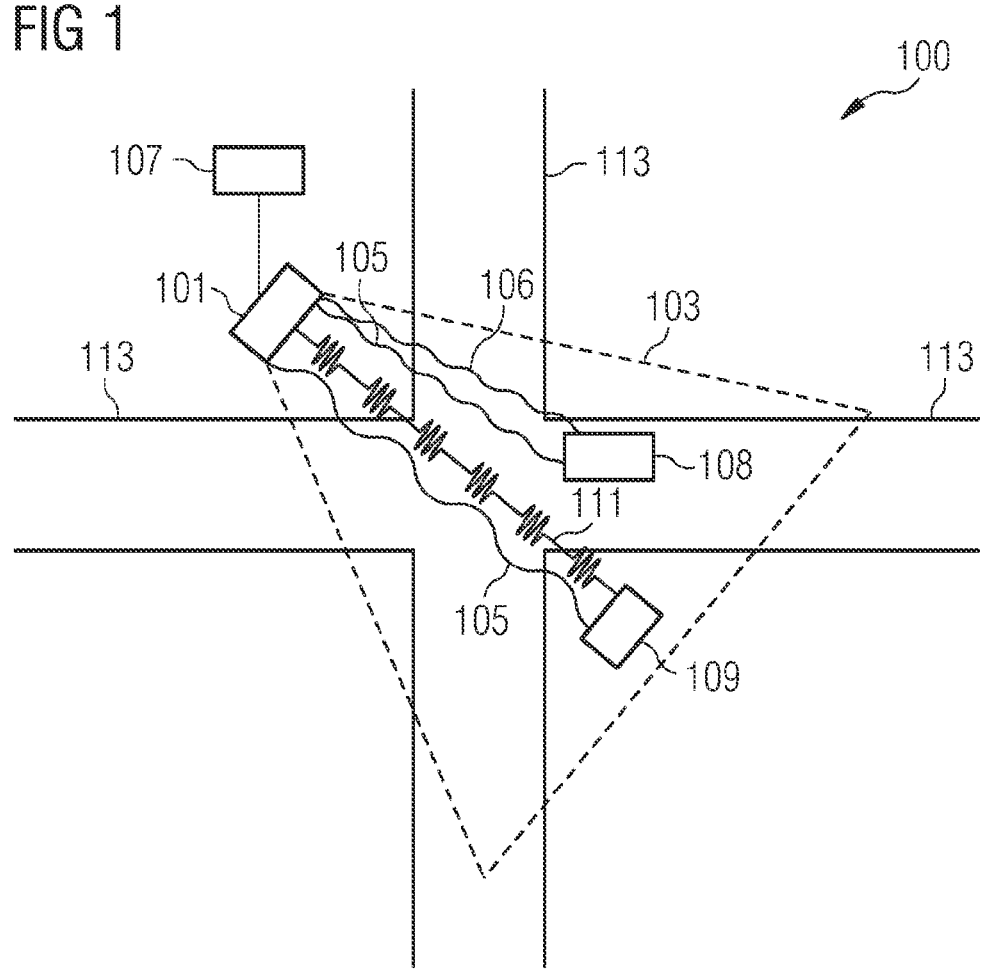
FIG. 1 is a schematic representation of a system for monitoring a traffic situation according to one embodiment.

FIG. 1 shows a schematic representation of a system 100 for monitoring a traffic situation according to one embodiment.

In the embodiment of FIG. 1, both the radar sensor unit 101 and also the reference signal unit 109 of the system 100 are arranged positionally fixed at a road section 113 for monitoring a traffic situation. In the embodiment shown in FIG. 1, the road section 113 is configured as a crossroads.

The radar sensor unit 101 comprises a monitoring region 103. The monitoring region 103 defines a region which the radar sensor unit 101 can monitor by emitting radar signals 105 and detecting reflected radar signals.

In an embodiment of FIG. 1, the reference signal unit 109 is arranged within the monitoring region 103 of the radar sensor unit 101.

The radar sensor unit 101 is further connected to a processor unit 107.

Furthermore, an object 108 is arranged in the monitoring region 103 of the radar sensor unit 101. The object 108 can be, for example, a traffic participant or another detectable object.

In order to determine the traffic situation within the monitoring region 103, the radar sensor unit 101 emits radar signals 105. The emitted radar signals 105 impinge upon the object 108 and are reflected by the object 108 back as reflected radar signals 106 to the radar sensor unit 101 which detects the reflected radar signals 106. On the basis of the detected reflected radar signals 106, the radar sensor unit 101 generates environmental data for the objects within the monitoring region 103. On the basis of this environmental data from the radar sensor unit 101, the processor unit 107 determines a traffic situation within the monitoring region 103. For the purpose of clarity in the drawing, in FIG. 1 only radar signals 105 which, firstly, impinge upon the object 108 and, secondly, which irradiate the reference signal unit 109 are shown. In order to determine the traffic situation within the monitoring region 103, additionally, radar signals 105 would be emitted which irradiate the entire monitoring region 103.

In the course of the emission of the radar signals 105 by the radar sensor unit 101 for determining the traffic situation within the monitoring region 103, radar signals 105 are reflected back to the radar sensor unit 101 by the reference signal unit 109 as a reference signal 111 in the form of modulated reflected radar signals. By way of the modulation of the reference signal 111 which is impressed upon the radar signals 105 by the reference signal unit 109 during the reflection process, the reference signal 111 detected by the radar sensor unit 101 can be identified by the processor unit 107 as a reference signal of the reference signal unit 109.

In the event that the radar sensor unit 101 detects the reference signal 111 of the reference signal unit 109, the processor unit 107 determines the functional state of the radar sensor unit as being viable and a malfunction of the radar sensor unit 101 can be ruled out.

In the event that the radar sensor unit 101 detects no reference signal of the reference signal unit 109, the processor unit 107 ascertains a malfunction of the radar sensor unit 101 and a monitoring of the traffic situation within the monitoring region 103 is ascertained as being malfunctioning and is possibly interrupted.

In the embodiment of FIG. 1, the reference signal unit 109 is designed exclusively as a reflector. An additional transmitter unit for emitting the reference signal 111 is not provided in the reference signal unit 109. The reference signals emitted 111 are based exclusively on the radar signals 105 emitted by the radar sensor unit 101.

The radar sensor unit 101 can be any desired commercially available radar sensor. The radar signals 105 emitted can be disposed in a frequency range that is typical for radar signals.

The modulation of the reference signals 111 is achieved by way of the reference signal unit 109 in that the reference signal unit 109 is switched alternatingly between the first reflection state and a second reflection state. The radar signals reflected by the reference signal unit 109 in the first and second reference states therein differ in at least one property. For example, the first reflection state can be realized in that a reflection of the radar signals 105 is enabled by the reference signal unit 109, whereas in the second reflection state, no reflection takes place at the reference signal unit 109.

As an alternative to the embodiment shown in FIG. 1, the system 100 can comprise a plurality of radar sensor units 101 in order, for example, to view a larger monitoring region or to enable a more exact monitoring of a road section with a complex arrangement. Furthermore, the system 100 can comprise a plurality of reference signal units 109 each of which is arranged to emit corresponding reference signals to the plurality of radar sensor units 101.

Figure 2:
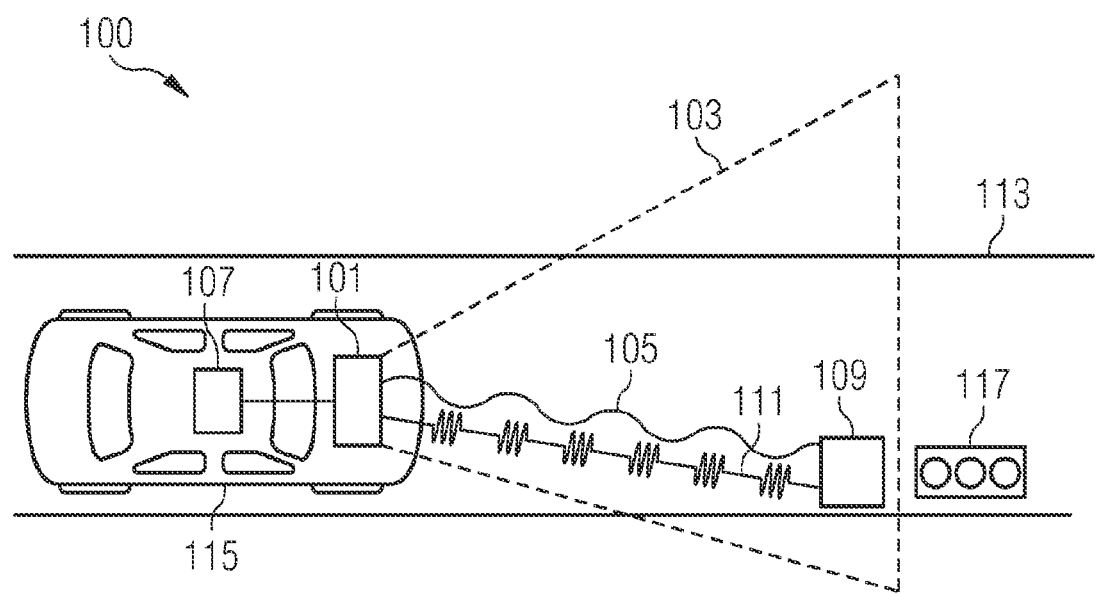
FIG. 2 is a further schematic representation of the system for monitoring a traffic situation according to a further embodiment.

FIG. 2 shows a further schematic representation of the system 100 for monitoring a traffic situation according to a further embodiment.

As distinct from the embodiment of FIG. 1, in the embodiment of FIG. 2, the radar sensor unit 101 is arranged in a vehicle 115, in particular a self-driving vehicle 115. The processor unit 107 is also arranged in the vehicle 115. The reference signal unit 109, by contrast, is arranged positionally fixed at a road section 113. In particular, the reference signal unit 109 is arranged at a light signal installation 117. As distinct therefrom, the reference signal unit 109 can be arranged at any desired site of the road section 113 to be monitored.

Similarly to FIG. 1, the radar sensor unit 101 for monitoring the traffic situation within the monitoring region 103 emits radar signals 105, detects radar signals reflected from corresponding objects within the monitoring region 103, on the basis of the detected radar signals, generates environmental data which is evaluated by the processor unit 107 and a traffic situation is determined on the basis of the environmental data. For the avoidance of unnecessary repetition, these processes are not shown in FIG. 2.

Radar signals 105 emitted by the radar sensor unit 101 are reflected by the reference signal unit 109 and a reference signal 111 in the form of a modulated reflected radar signal is sent back to the radar sensor unit 101. On the basis of this reference signal 111, the processor unit 107 determines the functional state of the radar sensor unit 101, in that in the absence of a corresponding reference signal, the radar sensor unit is determined to be malfunctioning.

Figure 3:
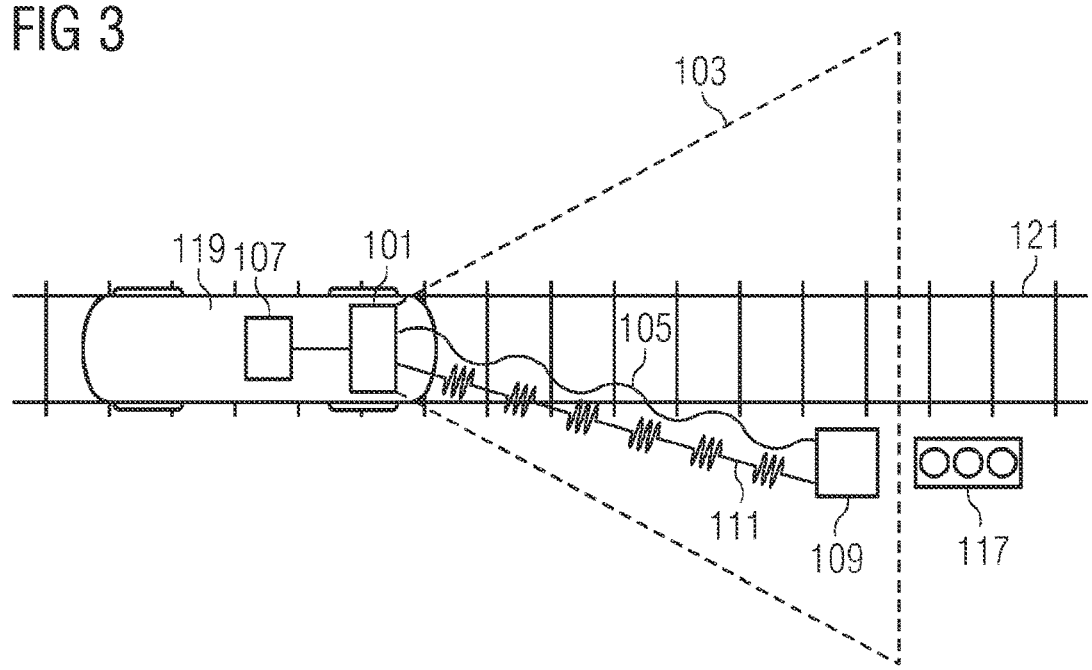
FIG. 3 is a further schematic representation of the system for monitoring a traffic situation according to a further embodiment.

FIG. 3 shows a further schematic representation of the system 100 for monitoring a traffic situation according to a further embodiment.

The embodiment of FIG. 3 differs from the embodiment of FIG. 2 merely in that the radar sensor unit 101 and the processor unit 107 are arranged in a self-driving rail vehicle 119 which is travelling on a rail section 121.

Figure 4:
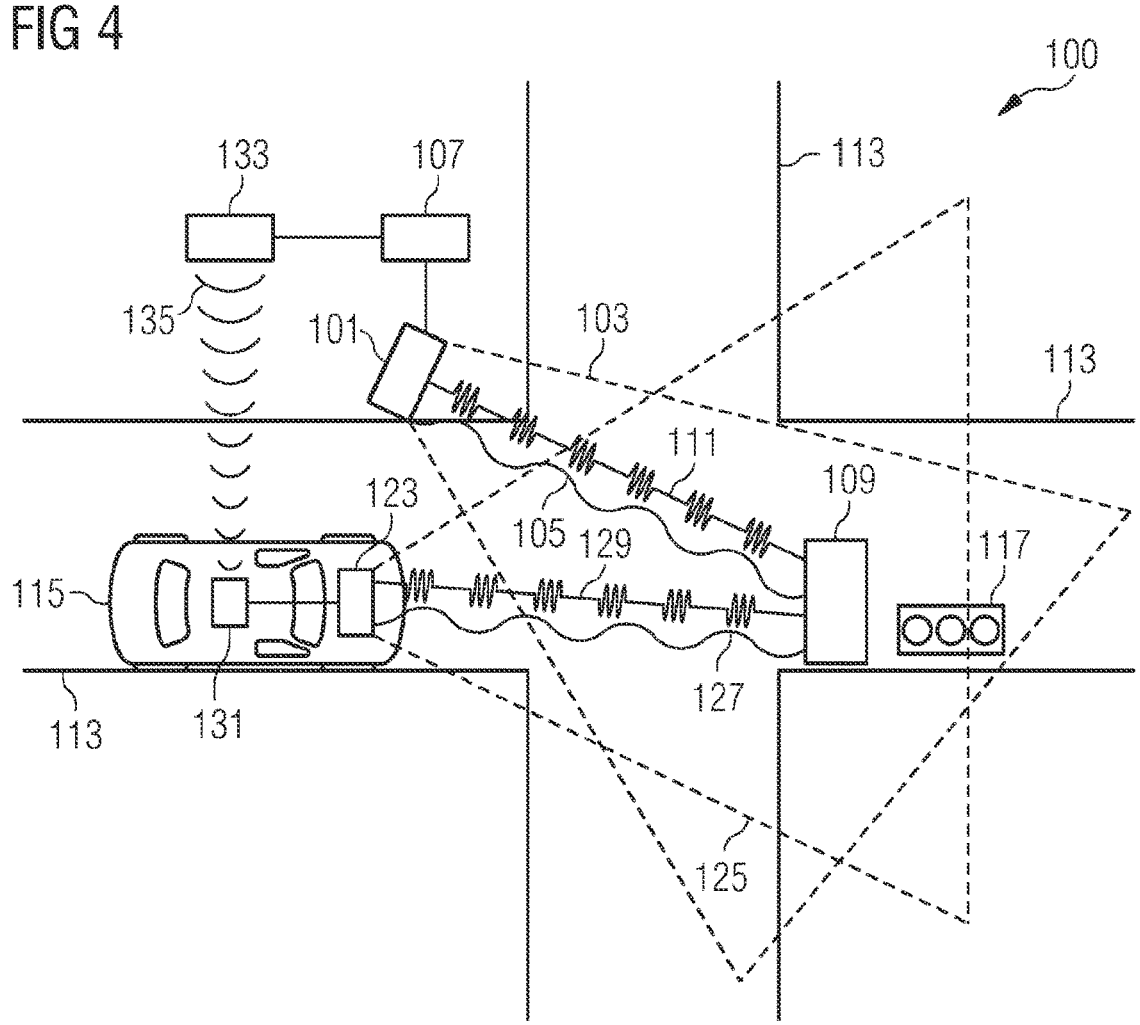
FIG. 4 is a further schematic representation of the system for monitoring a traffic situation according to a further embodiment.

FIG. 4 shows a further schematic representation of the system 100 for monitoring a traffic situation according to a further embodiment.

The embodiment shown in FIG. 4 is based upon the embodiment of FIG. 1. In addition to the features shown in FIG. 1, the system 100 in the embodiment of FIG. 4 comprises a further radar sensor unit 123 and a further processor unit 131, each of which is arranged in a self-driving vehicle 115. The further radar sensor unit 123 is configured to determine a traffic situation within a further monitoring region 125. For this purpose, the further radar sensor unit 123 emits further radar signals 127 which are reflected from objects within the further monitoring region 125 and are detected by the further radar sensor unit 123. On the basis of the detected further radar signals 127, the further radar sensor unit 123 generates environmental data on the basis of which the further processor unit 131 determines a traffic situation within the further monitoring region 125.

A detection of objects within the monitoring region 103 or of the further monitoring region 125 by the radar sensor unit 101 or the further radar sensor unit 123 is not shown in FIG. 4 for the sake of clarity.

Further radar signals 127 emitted by the further radar sensor unit 123 are reflected from the reference signal unit 109 which is arranged within the further monitoring region 125, and further reference signals 129 in the form of modulated reflected further radar signals are transferred by the reference signal unit 109 to the further radar sensor unit 123. On the basis of the further reference signals 129 detected by the further radar sensor unit 123, the further processor unit 131 determines the functional state of the further radar sensor unit 123 in that if a further reference signal 129 is not detected by the further radar sensor unit 123, a malfunction of the further radar sensor unit 123 is ascertained.

Via the modulation of the further reference signals 129, these further reference signals 129 are unambiguously identifiable by way of the further processor unit 131 as reference signals of the reference signal unit 109. For this purpose, the system 100 in the embodiment of FIG. 4 comprises a radio transfer unit 133 which is connected to the processor unit 107. Via the radio transfer unit 133, by means of the emission of corresponding radio signals 135 to the processor unit 131, information is transferred, on the basis of which the further processor unit 131 can identify the modulation of the further reference signals 129.

In practice, therefore, a self-driving vehicle 115 could drive in the transmitting region of the radio transfer unit 133 and could receive therefrom, by means of a transfer via the emission of the radio signals 135, the information that is needed to decode the reference signals of the reference signal unit 109 in order thereby to identify unambiguously the reference signals of the reference signal unit 109 as reference signals.

After the transfer of the decoding function by way of the radio transfer unit 133 to the further processor unit 131 of the self-driving vehicle 115, as soon as the road section 113 in which the reference signal unit 109 is arranged enters the further monitoring region 125, said vehicle could receive the further reference signals 129 via the further radar sensor unit 123 and, on the basis of the transferred decoder information, could unambiguously identify them as reference signals.

It can thus be achieved that any self-driving vehicles which reach the road section monitored by the system 100 are supplied with the necessary information by means of which any self-driving vehicles decode the reference signals of the reference signal unit or the plurality of reference signal units of the system 100 and can thus identify them as reference signals.

Therefore, for any self-driving vehicles, the system 100 is able to check the functioning of the radar sensor units of the vehicles by means of the reference signals emitted by the reference signal unit 109.

FIG. 5 and FIG. 6 show a schematic representation of a reference signal unit 109 of the system 100 for monitoring a traffic situation according to one embodiment in two states.

In the embodiment of FIG. 5 and FIG. 6, the radar sensor unit 101 comprises a radar logic system 137 and a radar antenna array 139. Both components are components of commercially available radar sensors. By means of radar logic 137 and the radar antenna array 139, the radar sensor unit 101 is capable of emitting radar signals 105.

Furthermore, in FIG. 5 and FIG. 6, a first reflection area 141 and a second reflection area 143 of the reference signal unit 109 are shown. The first reflection area 141 and the second reflection area 143 are spaced from one another by a spacing 145.

In FIG. 5, the case is shown in which the first reflection area 141 is in a reflection position and radar signals 105 of the radar sensor unit 101 are reflected from the first reflection area 141 of the reference signal unit 109.

In FIG. 6, the case is shown in which the first reflection area 141 is in a non-reflection position in which no reflection of the radar signals 105 takes place, whereas the second reflection area 143 is arranged in a reflection position and a reflection of the radar signals 105 from the second reflection area 143 takes place.

Due to the spacing 145 between the first reflection area and the second reflection area, a difference exists in the size of the distance travelled between the radar signals reflected from the first reflection area 141 and the radar signals reflected from the second reflection area 143.

This distance difference of the radar signals reflected from the different reflection areas is detectable by the radar sensor unit 101. Thus, by way of an alternating switching between the state of the reference signal unit 109 shown in FIG. 5 and the state thereof shown in FIG. 6, a modulated reference signal can be generated, wherein portions of radar signals reflected from the first reflection area 141 and portions of radar signals reflected from the second reflection area 143 alternate.

By way of the switching between the first reflection state of the reference signal unit 109 shown in FIG. 5 and the second reflection state shown in FIG. 6, any modulated reference signal can thus be generated with any modulation frequency.

Alternatively, any desired information can be impressed upon the reference signal by corresponding switching between the two reflection states.

Figure 7:
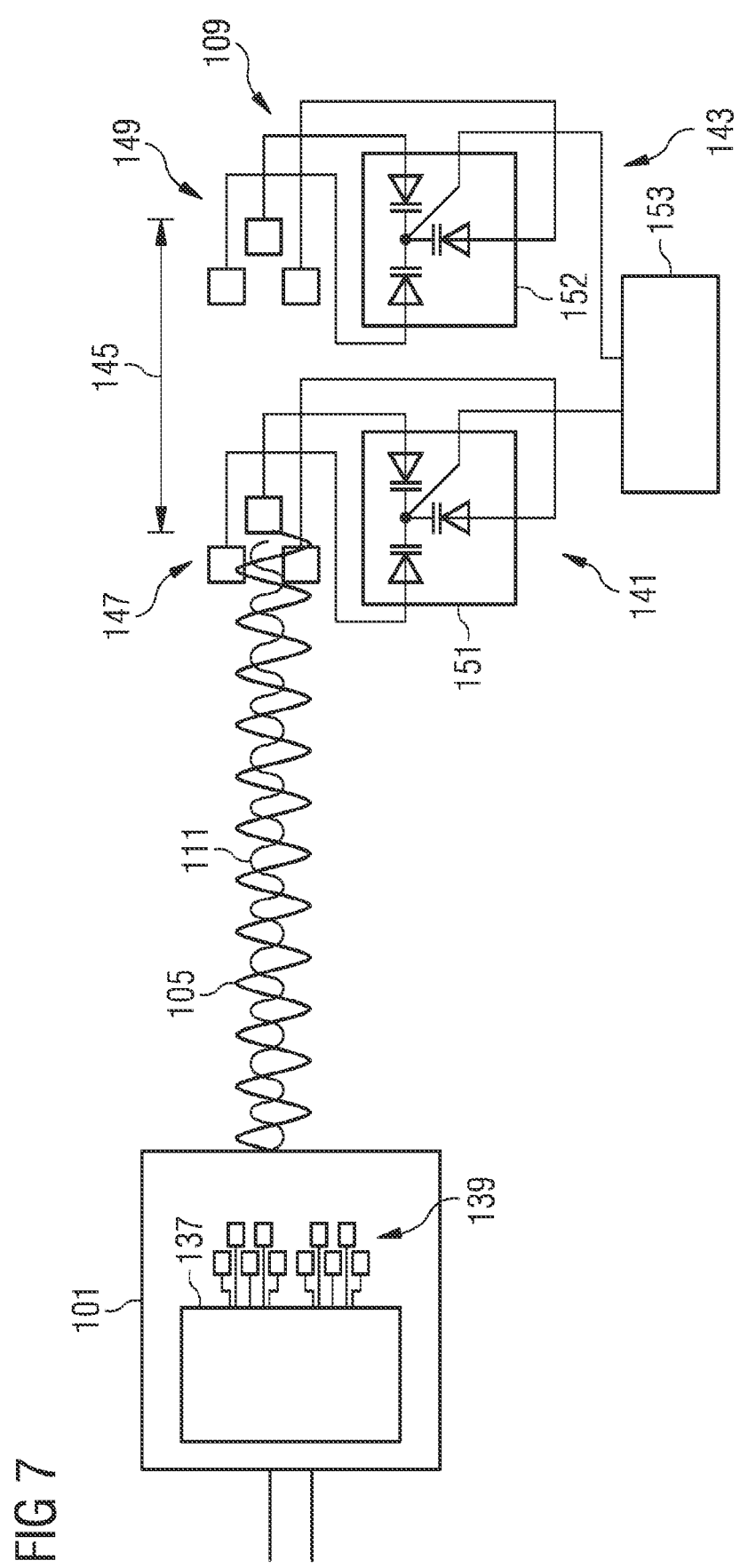
FIG. 7 is a further schematic representation of the reference signal unit of the system for monitoring a traffic situation according to a further embodiment.

FIG. 7 shows a further schematic representation of the reference signal unit 109 of the system 100 for monitoring a traffic situation according to a further embodiment.

In the embodiment in FIG. 7, the first reflection area 141 is realized by a first antenna array 151 and the second reflection area 143 is realized by a second antenna array 149. The first antenna array 147 is connected via a high frequency switch 151 to a control logic system 153. The second antenna array 149 is connected via a further high frequency switch 152 to the control logic system 153.

Via the control logic system 153 and the two high frequency switches 151, 152, the two antenna arrays 147, 149 can be switched on and off alternatingly. In a switched-on state, the two antenna arrays 147, 149 are designed to reflect radar signals 105 of the radar sensor unit 101, whereas in a switched-off state, the antenna arrays 147, 149 cannot cause any reflection of the radar signals 105.

The first antenna array 147 and the second antenna array 149 are separated from one another in the embodiment of FIG. 6 by the spacing 145.

By way of alternating switching on and off of the first and second antenna arrays 147, 149, the first reflection state of the reference signal unit 109 shown in FIG. 5 and the second reflection state of the reference signal unit 109 shown in FIG. 6 can thus be created alternatingly. By way of the alternating switching on and off of the first and second antenna arrays 147, 149, a reference signal 111 modulated as desired can thus be created.

Figure 8:
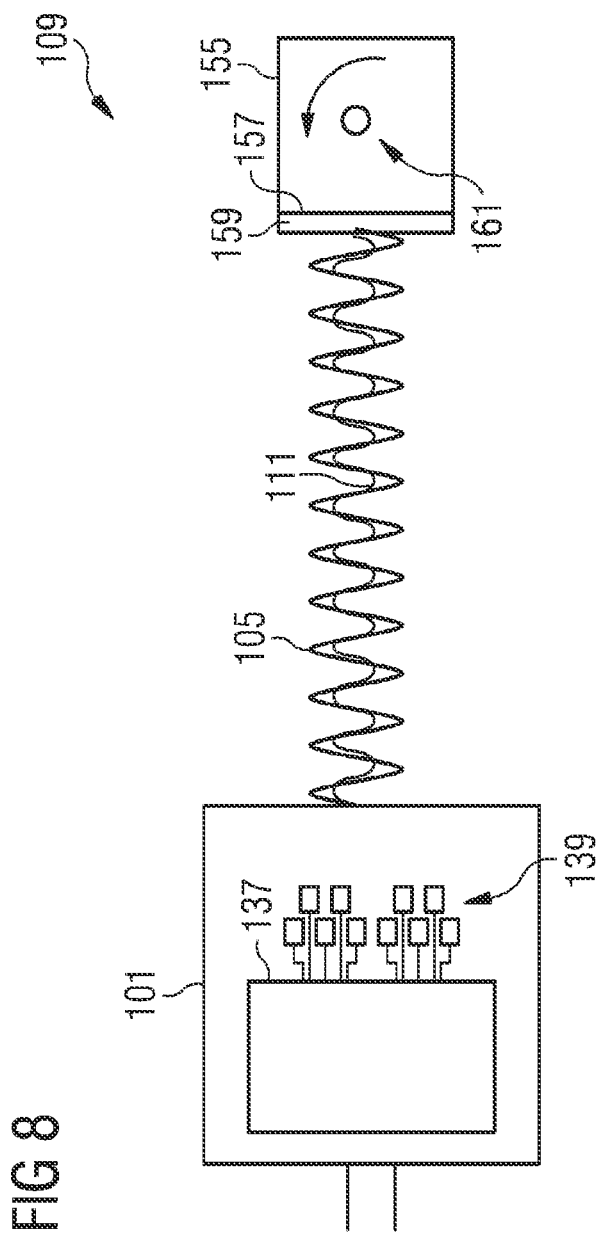
FIG. 8 is a further schematic representation of the reference signal unit of the system for monitoring a traffic situation according to a further embodiment.
Figure 10:
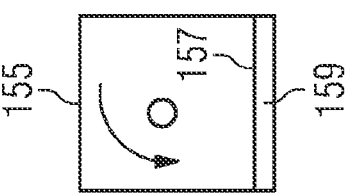
FIG. 10 is a schematic representation of the reference signal unit of the system for monitoring a traffic situation of FIG. 8 in a further state.
Figure 9:
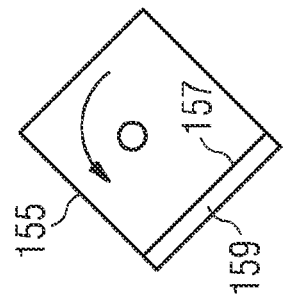
FIG. 9 is a schematic representation of the reference signal unit of the system for monitoring a traffic situation of FIG. 8 in a further state.

FIG. 8, FIG. 9 and FIG. 10 show a further schematic representation of the reference signal unit 109 of the system 100 for monitoring a traffic situation according to a further embodiment in three states.

In the embodiment of FIG. 8, FIG. 9 and FIG. 10, the reference signal unit 109 comprises a reflector body 155 which comprises at least one body area 157 onto which a reflection layer 159 which is configured to reflect radar signals is applied. In the embodiment of FIG. 8, FIGS. 9 and FIG. 10, the reflector body 155 is configured as a cuboid body. Alternatively, the reflector body 155 can have any desired form with a body area 157.

In FIG. 8, the case is shown in which the body area 157, in particular the reflection layer 159 is arranged in the reflection position and a reflection of the radar signals 105 emitted by the radar sensor unit 101 are reflected by the reflection layer 159.

FIG. 9 shows the case that the reflection layer 159 is rotated by 45° out of the reflection position so that a reduction in the reflecting capability of the reflection layer 159 is created. In FIG. 9, the orientation of the radar sensor unit 101 and of the reflector body 155 and the direction of emitted radar signals 105 is identical to those shown in FIG. 8. The case shown in FIG. 9 differs from that in FIG. 8 only in a rotation of the reflector body 155 through 45°.

FIG. 10 shows the case that the reflection layer 159 is rotated by 90° out of the reflection position so that a reflection of the radar signals 105 by the reflector body 155 cannot occur. In FIG. 10, the orientation of the radar sensor unit 101 and of the reflector body 155 and the direction of the emitted radar signals 105 is identical to those shown in FIG. 8. The case shown in FIG. 10 differs from that in FIG. 8 only in a rotation of the reflector body 155 through 90°.

In that the reflector body 155 is switched between the states shown in FIG. 8, FIG. 9 and FIG. 10, a modulation of the reflected radar signals and thus a modulated reference signal 111 can be generated. For this purpose, the reflector body 155 can be rotated about the rotation axis 161, for example, with any desired selectable rotation speed, so that with a corresponding frequency, the reflection layer 159 is brought into the reflection position and an amplitude-modulated reference signal 111 can be generated in that portions with reflected radar signals and portions without reflected radar signals follow one another alternately. By way of the arbitrarily settable rotation speed, a reference signal modulated with any desired frequency can be generated. Thus, any desired encoding can be applied to the reference signal.

As an alternative to the embodiments shown in FIGS. 1 to 4, the reference signal unit 109 can be arranged, for example, on vehicles. Thus, via corresponding radar sensor units which are either installed positionally fixed at a road section or rail section to be monitored or are installed on other vehicles, information relating to the respective vehicle can be exchanged via suitably modulated reference signals.

Thus, information relating to the traffic situation can be exchanged between individual vehicles. Alternatively, information can be exchanged between a positionally fixed system and a moving vehicle. For example, via the reference signal unit installed on a vehicle, a signal or information item transferred from another vehicle or from a positionally fixed sensor unit can be confirmed as received by way of a correspondingly modulated reference signal.

Although the invention has been illustrated and described in detail with the preferred exemplary embodiment, the invention is not restricted by the examples disclosed and other variations can be derived therefrom by a person skilled in the art without departing from the protective scope of the invention.

The invention claimed is:

1. A system for monitoring a traffic situation, the system comprising:
    at least one radar sensor unit for recording environmental data for a monitoring region of the radar sensor unit, the radar sensor unit being configured to emit radar signals in a direction of the monitoring region, to receive radar signals reflected by objects within the monitoring region towards the radar sensor unit and, based on received radar signals, to generate environmental data for the monitoring region;
    a processor connected to the at least one radar sensor unit for evaluating the environmental data and for determining the traffic situation within the monitoring region based on the environmental data received from the at least one radar sensor unit;
    a reference signal unit configured to provide a radar signal emitted by the at least one radar sensor unit with a modulation to generate a modulated radar signal, and to reflect the modulated radar signal back to the at least one radar sensor unit as a reference signal;
    the processor being configured to identify the modulated radar signal as the reference signal from the reference signal unit and to recognize a malfunction of the at least one radar sensor unit if no reference signal is received by the at least one radar sensor unit; and
    wherein the reference signal unit has a first reflection state and a second reflection state and wherein a radar signal reflected by the reference signal unit in the first reflection state deviates in at least one property from a radar signal reflected by the reference signal unit in the second reflection state, wherein the reference signal unit is alternatingly switchable at a given switching frequency between the first reflection state and the second reflection state, and wherein the reference signal unit is configured to modulate the radar signal by alternatingly switching at the given frequency between the first reflection state and the second reflection state to generate the modulated radar signal;
    wherein the reference signal unit has a first reflection area configured to reflect radar signals of the radar sensor unit, and wherein in the first reflection state, the reflection area is brought into a reflection position in which a reflection of the radar signal of the radar sensor unit is enabled and wherein in the second reflection state, the reflection area is brought into a non-reflecting position in which a reflection of the radar signals from the radar sensor unit is prevented.

2. The system according to claim 1, wherein the reference signal unit has a second reflection area configured to reflect radar signals of the radar sensor unit, and wherein in the second reflection state, the second reflection area is brought into a reflection position in which a reflection of the radar signals of the radar sensor unit is enabled by the second reflector unit.

3. The system according to claim 2, wherein the first reflection area and the second reflection area are arranged at mutually different distances from the radar sensor unit.

4. The system according to claim 2, wherein the reference signal unit comprises a first antenna array and a second antenna array each configured to reflect radar signals of the radar sensor unit and wherein the first reflection area is formed by the first antenna array and the second reflection area is formed by the second antenna array.

5. The system according to claim 2, wherein the reference signal unit comprises a reflector body with at least one body area having a reflection layer applied thereon, the reflection layer being configured to reflect radar signals, and at least one of the first reflection area or the second reflection area being formed by the reflection layer applied to the at least one body area.

6. The system according to claim 1, wherein the reference signal unit comprises an antenna array configured to reflect radar signals of the radar sensor unit and wherein the reflection area is formed by the antenna array.

7. The system according to claim 1, wherein the reference signal unit comprises a reflector body with at least one body area having a reflection layer applied thereon, the reflection layer being configured to reflect radar signals, and the first reflection area being formed by the reflection layer applied to the at least one body area.

8. The system according to claim 1, wherein the radar sensor unit is positionally fixed at a road section or a rail section that is to be monitored, and wherein the reference signal unit is positionally fixed in the monitoring region of the radar sensor unit.

9. The system according to claim 1, which comprises:
    a further radar sensor unit for recording environmental data for a further monitoring region of the further radar sensor unit, the further radar sensor unit being configured to emit further radar signals in a direction of the further monitoring region, to receive radar signals reflected by objects within the further monitoring region towards the further radar sensor unit and, based on the further radar signals reflected by the objects, to generate further environmental data for the further monitoring region;
    the further radar sensor unit being mounted on a self-driving vehicle;
    a further processor connected to the further radar sensor unit for evaluating the further environmental data and for determining the traffic situation within the further monitoring region based on the further environmental data from the further radar sensor unit; and
    wherein the reference signal unit is configured to provide further radar signals emitted by the further radar sensor unit with the modulation and to reflect back to the further radar sensor unit a further modulated radar signal as a further reference signal; and
    wherein the further processor is configured to identify the further modulated radar signal as a further reference signal of the reference signal unit and to recognize a malfunction of the further radar sensor unit if no further reference signal is received by the further radar sensor unit.

10. The system according to claim 1, wherein the given switching frequency between the first reflection state and the second reflection state lies between 60 MHz and 85 MHz.

11. The system according to claim 1, wherein based on the recognizing of the malfunction of the at least one radar sensor unit when no reference signal is received by the at least one radar sensor unit, the processing being configured to terminate the monitoring by the at least one radar sensor of the traffic situation.

* * * * *